US009781660B2

(12) United States Patent
Budhwani et al.

(10) Patent No.: US 9,781,660 B2
(45) Date of Patent: Oct. 3, 2017

(54) SYSTEM AND METHOD TO IDENTIFY, DETECT AND OBTAIN SERVICE ON A CLOSED SUBSCRIBER GROUP (CSG) CELL (71) Applicant: Avago Technologies General IP (Singapore) Pte. Ltd., Singapore (SG)

(72) Inventors: Sultan Budhwani, Laurence Harbor, NJ (US); Sridhar Prakasam, Morganville, NJ (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 737 days.

(21) Appl. No.: 13/927,035

(22) Filed: Jun. 25, 2013

(65) Prior Publication Data

US 2014/0378132 A1 Dec. 25, 2014

Related U.S. Application Data (60) Provisional application No. 61/836,864, filed on Jun. 19, 2013.

(51) Int. Cl.
H04W 48/16 (2009.01)
H04W 40/24 (2009.01)
H04W 64/00 (2009.01)

(52) U.S. Cl.
CPC .......... *H04W 48/16* (2013.01); *H04W 40/244* (2013.01); *H04W 64/00* (2013.01)

(58) Field of Classification Search
None
See application file for complete search history.

(56) References Cited

U.S. PATENT DOCUMENTS

| 6,173,181 | B1 * | 1/2001 | Losh | H04W 36/0061 370/329 |
| 8,532,652 | B1 * | 9/2013 | Edara | H04W 4/001 455/432.3 |
| 2007/0275717 | A1 * | 11/2007 | Edge | H04W 48/16 455/434 |
| 2011/0286437 | A1 * | 11/2011 | Austin | H04W 4/02 370/338 |
| 2011/0287787 | A1 * | 11/2011 | Nagaraja | H04J 11/0069 455/456.3 |
| 2012/0269095 | A1 * | 10/2012 | Dalsgaard | H04W 48/16 370/255 |

(Continued)

*Primary Examiner* — Daniel Lai
(74) *Attorney, Agent, or Firm* — Foley & Lardner LLP (57) ABSTRACT Various configurations and arrangements of various systems and methods for identifying, detecting and obtaining service on closed subscriber group systems are disclosed. A method in accordance with the disclosure includes receiving first information from a first AP that supports a first wireless technology. The first information is indicative of the first AP. The method further includes determining if the first information matches second information stored in a memory in association with third information stored in the memory. The third information is indicative of a second AP that supports a second wireless technology. The method further includes, upon determining, that the first information matches the second information, attempting to establish a connection with the second AP based on the third information.

20 Claims, 3 Drawing Sheets (56) References Cited

U.S. PATENT DOCUMENTS

2013/0023267 A1\* 1/2013 Ong ................. H04W 48/10
          455/435.1
2013/0295914 A1\* 11/2013 Tran ................ H04B 7/0691
          455/422.1

\* cited by examiner

SYSTEM AND METHOD TO IDENTIFY, DETECT AND OBTAIN SERVICE ON A CLOSED SUBSCRIBER GROUP (CSG) CELL

TECHNICAL FIELD

The present disclosure relates to systems and methods for managing the identification, detection and utilization of services on closed subscriber group systems.

BACKGROUND

In order to provide improved coverage for radio access networks, a concept utilizing very small base stations known as Closed Subscriber Group (CSG) cells has been introduced in 3$^{rd}$ Generation Partnership Project (3GPP) standards. CSG cells can be deployed inside a home, a workplace, a coffee place or a shopping mall and can provide full or restricted access to members to allow for offloading of traffic from macro-cells of the radio access network. A key issue with the deployment of CSG cells is how a CSG-enabled phone can know when to look for suitable CSG cells, without having to expend excess time and battery power to scan for CSG cells. In a mobile environment, identifying and detecting CSG cells can be challenging and may result in excessive power consumption.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DISCLOSURE

Figure 1:
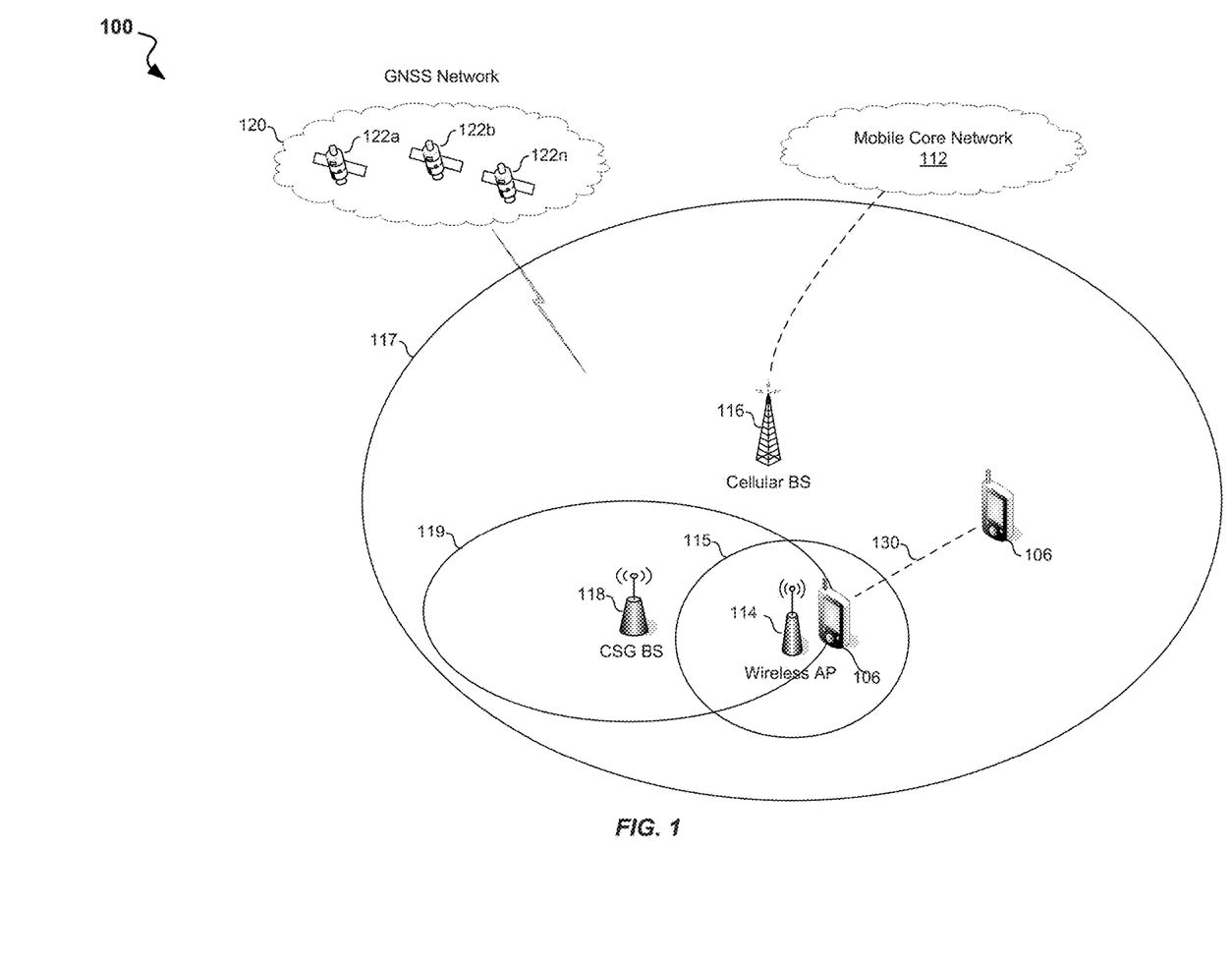
FIG. 1 illustrates a block diagram of an exemplary communication system in which a communication device that utilizes methods described herein for identifying, detecting and obtaining service on closed subscriber group (CSG) systems can operate.

FIG. 1 is a block diagram illustrating an exemplary communication system 100 that can provide wireless communication services to a plurality of mobile communication devices. The communication system 100 illustrates a single mobile communication device 106 without loss of generality. The illustrated mobile communication device 106 can utilize systems and methods for identifying, detecting and obtaining service on CSG systems according to various embodiments described in more detail herein. Exemplary mobile communication devices may include a cellular device, a Smartphone, a personal digital assistant (PDA), a tablet computer, and/or a laptop computer. Also shown in the communication system 100 is a mobile core network 112, a wireless access point (AP) 114, a cellular base station (BS) 116, a CSG base station 118 (CSG-BS), a global navigation satellite system (GNSS) network 120 and a plurality of GNSS satellites 122a-122n.

The wireless AP 114 may include suitable logic, circuitry, interfaces, and/or code that are operable to provide data services to communication devices, such as the mobile communication device 106, in adherence with one or more wireless LAN (WLAN) standards such as, for example, IEEE 802.11, 802.11a, 802.11b, 802.11d, 802.11e, 802.11n, 802.11 ac, 802.11v, and/or 802.11u. The wireless AP 114 may communicate with the mobile communication device 106 within a WLAN cell 115. The WLAN cell 115 is illustrated as an ellipse for illustrative purposes only. The wireless AP 114 may communicate with the mobile core network 112 and/or the internet (not shown), via one or more links and/or associated devices for example. In this manner, the wireless AP 114 may provide network access to the mobile communication device 106 when the mobile communication device 106 is within the WLAN cell 115.

The cellular BS 116 may include suitable logic, circuitry, interfaces, and/or code that are operable to provide voice and/or data services to communication devices, such as one or more of the mobile communication device 106, in adherence with one or more cellular communication standards. Exemplary cellular communication standards may include Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). The cellular BS 116 may communicate with the mobile communication device 106 within a macro-cell 117. The macro-cell 117 is illustrated as an ellipse for illustrative purposes only. The cellular BS 116 may communicate with the mobile core network 112 and/or the internet, via one or more backhaul links and/or associated devices for example. In this manner, the cellular BS 116 may provide network access to the mobile communication device 106 when the mobile communication device 106 is within the macro-cell 117.

The CSG-BS 118 may include suitable logic, circuitry, interfaces, and/or code that are operable to provide voice and/or data services to communication devices, such as one or more of the mobile communication device 106, in adherence with the one or more cellular communication standards that the cellular BS 116 supports. The CSG-BS 118 may communicate with the mobile communication device 106 within a CSG cell 119. The CSG cell 119 is illustrated as an ellipse for illustrative purposes only. The CSG-BS 118 may communicate with the mobile core network 112 and/or the internet via one or more backhaul links and/or associated devices for example.

The CSG-BS 118 may have a list of a limited number of mobile communication devices that are certified to communicate with the CSG-BS 118. The mobile communication device 106 may be one of these certified devices if the CSG-BS 118 is identified on a "white-list" of CSG-BSs that is stored in memory of the mobile communication device 106. In this manner, the CSG-BS 118 may provide network access to the certified mobile communication device 106 when the mobile communication device 106 is within the CSG cell 119 of the CSG-BS 118.

The mobile core network 112 may include suitable logic, circuitry, interfaces, and/or code that are operable to provide interfacing and/or connectivity servicing between access networks, which may be utilized by the mobile communication device 106, and external data networks such as packet data networks (PDNs) and/or the internet. The mobile core network 112 may correspond to one or more service providers that provide, control, and/or manage network accessibility available via the mobile communication device 106.

In this regard, the mobile communication device 106 may access the mobile core network 112 via the wireless AP 114, the cellular BS 116 and/or the CSG-BS 118. The mobile core network 112 may communicate various data services, which are provided by external data networks, to associated user devices such as, for example, the mobile communication device 106.

The mobile communication device 106 may include suitable logic, circuitry, interfaces, and/or code for implementing various aspects of the embodiments disclosed herein. In this regard, the mobile communication device 106 may be operable to communicate via a plurality of wired and/or wireless connections. The mobile communication device 106 may be operable, for example, to transmit to and/or receive signals from one or more of the wireless AP 114, the cellular BS 116, the CSG-BS 118 and/or the GNSS network 120. Also, the mobile communication device 106 may be operable to communicate with, and/or receive services provided by the internet and/or the mobile core network 112.

The GNSS network 120 may include suitable logic, circuitry, interfaces, and/or code that may provide navigation information to land-based devices via satellite links. In this regard, the GNSS network 120 may include, for example, the plurality of GNSS satellites 122a-122n, each of which is operable to provide satellite transmissions based on a GNSS system. Exemplary GNSS systems may include, for example, GPS, GLONASS, Galileo-based satellite system, Beidou and/or Compass systems. Accordingly, the GNSS network 120 may be operable to provide positioning information via downlink satellite links transmitted from one or more of the plurality of GNSS satellites 122a-122n to enable land-based devices, such as the mobile communication device 106, to determine its location. The plurality of GNSS satellites 122a-122n may directly provide positioning information and/or a land-based device may utilize satellite transmissions from different satellites to determine its location using, for example, triangulation based techniques.

The CSG-BS 118 and the CSG cell 119 are sometimes referred to as a femtocell of the mobile core network 112. The CSG cell 119 typically covers a smaller area than the macrocell 117 and there may be many CSG-BSs 119 and corresponding CSG cells 119 within a single macrocell 117. The wireless AP 114 can serve the mobile communication device 106 when the mobile communication device 106 is within WLAN cell 115. Typically, the WLAN cell 115 is smaller than the CSG cell 119 of the CSG-BS 119.

When the mobile communication device 106 travels into the WLAN cell 115, via a path 130, for example, a WLAN search procedure is performed and the mobile communication device 106 can establish a WLAN connection with the wireless AP 114. In a similar fashion, when the path 130 results in the wireless communication device 106 being within the CSG cell 119, a CSG search routine, referred to as an autonomous search function or ASF, is initiated and a connection may be established with the CSG-BS 118 if the mobile communication device 106 is certified (via a white list entry on a SIM card of the mobile communication device 106, for example) to be served by the CSG-BS 118.

Often times, the WLAN cell 115 and the CSG cell 119 may overlap. This may occur because the CSG-BS 118 may be linked to the mobile core network 112 via the wireless AP 114 using the internet, for example. In other situations, the wireless AP 114 may be located in a home or office that is located in the same neighborhood or building being served by the CSG-BS 118. Accordingly, the mobile communication device 106 may be operable, using methods and systems described herein, to coordinate searches between the WLAN search routine and the ASF routine and provide a more efficient method of identifying when the mobile communication device 106 can establish a connection with the CSG-BS 118 and/or the wireless AP 114.

Figure 2:
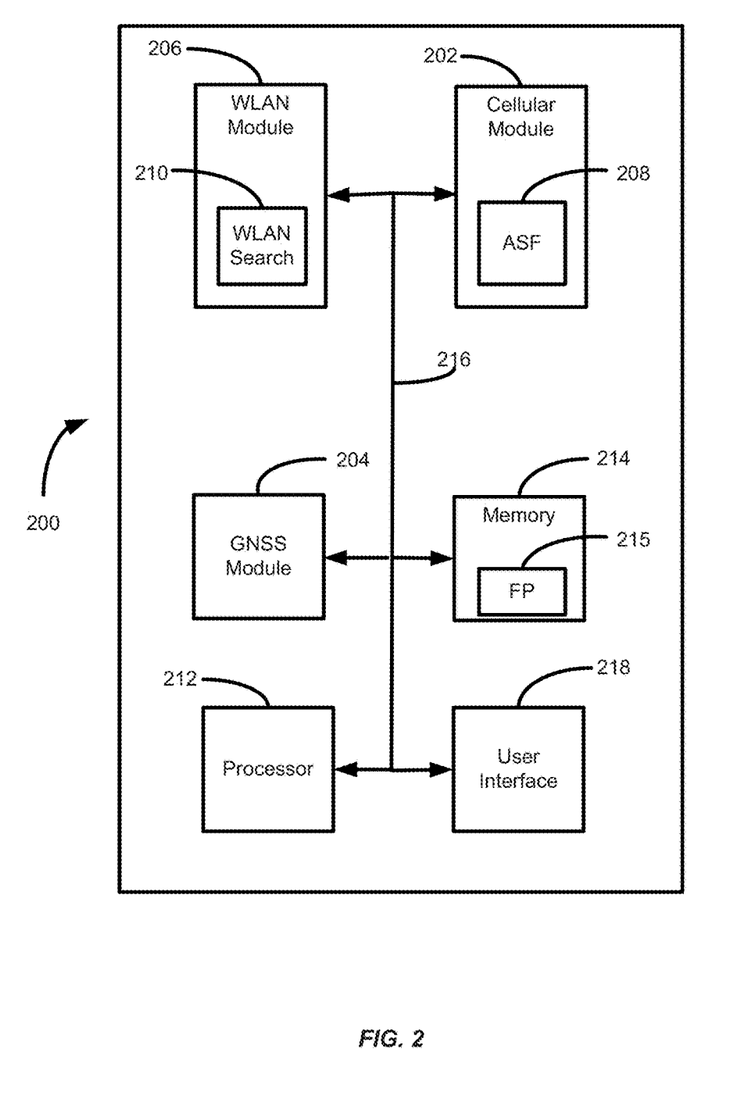
FIG. 2 illustrates a block diagram of an exemplary communication device that utilizes methods described herein for identifying, detecting and obtaining service on CSG systems.

FIG. 2 illustrates a block diagram of an exemplary communication device 200 that may identify, detect and obtain service on CSG systems according to various embodiments described in more detailed herein. The communication device 200 may communicate information over wired and/or wireless communication networks in accordance with various communication standards. The communication device 200 can represent a mobile communication device, such as a cellular phone or a smartphone, a mobile computing device, such as a tablet computer, a personal digital assistant, a watch, or a laptop computer, or any other electronic device that is capable of communicating information over communication networks that will be apparent to those skilled in the relevant arts. The communication device 200 can be implemented to be substantially similar to the mobile communication device 106 shown in FIG. 1.

The communication device 200 can include a cellular module 202, a location based services module, such as GNSS module 204, a wireless local area network (WLAN) module 206, a processor 212, a memory 214, a user interface 218, or any combination thereof which are communicatively coupled to one another via a communication interface 216. The various modules can be used in assisting to provide communications links for allowing the communication device 200 to communicate with other communication devices. The processor 212 and memory 214 can also be used for implementing some aspects of WLAN and CSG detection methods described herein. The memory 215 may store fingerprint information in a fingerprint database 215. The fingerprint information may include identifiers for WLAN and/or CSG systems that the communication device 200 has detected and obtained services from in the past as well as location information obtained with the GNSS module 204.

In some implementations, two or more of the modules included in the communication device 200 can be integrated to form a combination module. The communication device 200 need not include all of: the cellular module 202, the GNSS module 204 and/or the WLAN module 206. Those skilled in the relevant art(s) will recognize that other configurations and arrangements of the communication device 200 may be possible. Additionally, those skilled in the relevant art(s) will also recognize that the cellular module 202, the GNSS module 204, the WLAN module 206, the processor 212, the memory 214, and the user interface 218 need not necessarily be communicatively coupled to one another via the communication interface 216. In some situations, those modules that are communicatively coupled to the communication interface 216 can independently communicate with other communication enabled devices without communication interface 216.

The GNSS module 204 can provide wireless communications between the communication device 200 and a GNSS Network, such as the GNSS Network 120 shown in FIG. 1, in accordance with various GNSS standards. The GNSS module 204 can receive various signals from various GNSS satellites, such as the satellites 122a-122n shown in FIG. 1, and to calculate a position of the communication device 200 based on the received signals. The GNSS module 204 may be implemented using a GNSS receiver which can use the GPS, GLONASS, Galileo and/or Beidou systems, among others, for calculating the position of the communication device 200.

The cellular module 202 can provide wireless communication between the communication device 200 and a cellular BS, such as the cellular BS 116 shown in FIG. 1, over a cellular network in accordance with various cellular communication standards such as a 3GPP LTE communications standard, a fourth generation (4G) mobile communications standard, or a third generation (3G) mobile communications standard to provide some examples. The cellular module 202 may also provide communication between the communication device 200 and a CSG-BS, such as the CSG-BS 118 shown in FIG. 1. The cellular module 202 may communicate with one or more transceivers, referred to as BSs, cells or APs, within the cellular network to provide voice and/or data communications between the communication device 200 and another cellular capable device via a network, such as the mobile core network 112 shown in FIG. 1.

The cellular module 202 includes an autonomous search function (ASF) 208. The autonomous search function 208 may provide algorithms for searching for CSG-BSs that the communication device is certified to communicate with as indicated by a whitelist of CSG-BS identifiers stored in the communication device 200. The whitelist may be stored in the memory 214 or in another memory device such as a subscriber identity module (SIM) card.

The ASF 208 can include one or more algorithms for identifying and detecting a CSG cell. For example, a user may have a CSG cell installed at the user's residency and the user would want to be latched onto this cell whenever the user was at the residence.

The ASF 208 can use one or more of many algorithms present in literature to identify the fingerprint of a CSG-BS. Most of these algorithms predict the presence of a CSG cell using a CSG fingerprint. A CSG fingerprint is typically a set of measurements or some unique marker (e.g., a land marker near a CSG-BS) that was taken when the user first time camps on a CSG cell for a first time using a manual search and selection process. These measurements can be saved in a fingerprint memory portion 215 of the memory 214 of the communication device 200 for a particular CSG.

Fingerprinting is a process to match current measurement results measured by the ASF 208 with saved fingerprints in the fingerprint memory 215. A match would suggest that the communication device is close to a previously visited CSG-BS and hence it can be used as a trigger to start searching for the CSG-BS. The fingerprint measurement can be of any type such as, for example, Cell-ID fingerprint (number of cells and cells IDs visible near interested CSG-BS), a reference signal receive power (RSRP) fingerprint (RSRP measurement of serving cell and all visible neighbor cells) and/or mobility information in terms of cell reselection or handoff (HO) history. This type of approach has some drawbacks.

These types of fingerprint information rely greatly on the stability of wireless cellular system and/or the environment where the measurements are taken (e.g., no shadowing effects, etc.). In many cases, the first time that a CSG-BS is fingerprinted occurs while a user does manual search and selection, e.g., in some areas if the coverage of a CSG-BS in such a way that the same CSG-BS sees different macro cells from within a different location of the CSG-BS coverage area. In these cases, the fingerprint of the CSG-BS may not be consistent or the communication device 200 may have to maintain more than one fingerprint for each cell of a CSG-BS in the fingerprint memory 215.

The computational power and the complexity of the ASF 208 predicting the presence of CSG cell could get quite complex and the success rate of finding the CSG cells in most scenarios can be quite low. That is, the algorithms utilized in some ASFs (such as ASF 208) may trigger a search when the communication device 200 goes near or around the CSG-BS cell where the fingerprint measurements were taken. However, if the fingerprint is taken in such a place in a house where the user rarely goes, the measurement of macrocells may not be the same as other locations in the house (e.g., a basement). In these scenarios the algorithms of the ASF 208 may not trigger a CSG cell search and user would end up staying latched onto a macro cell such as the macro cell 117 in FIG. 1 rather than the CSG cell 119 of the CSG-BS 118.

The WLAN module 206 can provide wireless communications between the communication device 200 and a wireless AP, such as the wireless AP 114 shown in FIG. 1, over a wired communication network and/or to a wireless communication network in accordance with various networking protocols such as Wi-Fi™ communications standard. The WLAN module 208 includes a WLAN search function 210 that identifies the wireless AP 114 when the mobile communication device 200 is in a vicinity of the WLAN access point (AP) 114. Upon latching onto a wireless AP such as the wireless AP 114, the WLAN module 206 can operate as a client to communicate with the wireless AP 114 or as the wireless AP 114 itself to provide communications between other WLAN capable devices and a communication network. The WLAN module 206 may communicate with the mobile core network and/or the internet, through the wireless AP 114, via one or more links and/or associated devices for example. In this manner, the WLAN module 206 may provide network access to the communication device 200 via the wireless AP.

CSG cells such as the CSG cell 119 of the CSG-BS 118 in FIG. 1 are typically connected to a service provider's network via a WLAN access (e.g., Wi-Fi™ access). The methods described herein utilize an interface between a WLAN stack of the WLAN module 206 and a cellular stack of the cellular module 202, where the interface communicates the detection of a WLAN AP (e.g., via a Wi-Fi™ ID including MAC address, and signal strength) from the WLAN search algorithm 210 to the ASF 208 via the communication interface 216, which serves as a fingerprint and is stored in association with a CSG fingerprint (e.g., a specific frequency band for a saved CSG, a specific radio access technology (RAT), an absolute radio frequency channel number (ARFCN (e.g., a UARFCN for the universal mobile telecommunications system (UMTS) or an EARFCN for LTE systems), RSRP and/or received signal strength indicator (RSSI)) of a CSG cell listed on a CSG white-list stored in the fingerprint database 215 or a SIM card of the communication device 200. Whenever the cellular module 202 receives a signal from the WLAN module 206 indicating that a WLAN AP has been identified, the cellular module 202 first checks if the received WLAN ID is already fingerprinted and checks if any CSG cells in the white list do not already have a related WLAN fingerprint. If either of these conditions is true, a CSG search is initiated with the ASF 208.

A search for a CSG cell may be conducted after a WLAN AP is identified with the WLAN search algorithm 210. The WLAN search algorithm 210 may include any available search algorithms. Fingerprint information related to the WLAN AP is saved in the cellular fingerprint database 215 in association with CSG fingerprints for any CSG cells that are found in the same area as the wireless AP and are on an allowed list (e.g., the white list) of the communication device 200.

Subsequent CSG searches are triggered when the fingerprinted wireless AP is again located by the WLAN search algorithm 210 and then, in some embodiments, only the related CSG cells stored in the fingerprint database 215 are searched for using the related CSG fingerprint information and the ASF 208.

Most smartphones have some form of WLAN capability (e.g., Wi-Fi™) and most femtocells (e.g., the CSG cell 119) are connected to service provider's network via a WLAN router/AP at the place where the femtocell is deployed (e.g., a house, workplace, coffee shop or shopping mall). In addition, the communication ranges of both WLAN APs and CSG cells can be about the same. Methods described herein can take advantage of the similarity in ranges of WLAN APs and CSG cells along with the fact that the WLAN module 206 stack already runs the WLAN search algorithm 210 in the WLAN module 206 to identify and detect WLAN AP in order to trigger searches for CSG cells with the ASF 208. Typically, the WLAN search algorithm 210 is faster and consumes less power than the ASF 208.

The methods described below make use of the information gathered by the WLAN search algorithm 210 and introduces an interface between the WLAN module 206 and the cellular module 202.

The WLAN module 206 communicates with the cellular module 202 via the communication interface 216 and passes an indication of the detection of WLAN AP fingerprint information including a WLAN identifier. The cellular module 202 then can use this fingerprint information to identify a CSG cell in a CSG white-list. Whenever the cellular module 202 receives an indication of detection of a wireless AP from the WLAN module 206, the cellular module 202 first checks if the received WLAN identifier is already stored in the fingerprint database 215 and checks if all the CSG cells have a fingerprint. If any one of these conditions is true, the cellular module 202 can trigger a CSG cell search with the ASF 208 on any available networks (e.g., on both E/UTRAN Radio Access Technology networks).

The systems and methods described herein can provide several advantages. Firstly, the WLAN search algorithms 210 for detecting a wireless AP are matured and can be leveraged by the cellular module 202. Secondly, the WLAN search algorithms 210 have proven to be fast and more efficient than some algorithms used by the ASF 208 in regards to battery consumption. Finally, there are fewer channels to scan to detect a wireless AP with the WLAN search algorithm 210 compared to the channels to search for CSG cells.

With the proposed approach, the communication device 200 will perform a CSG cell search with the ASF 208 when a wireless AP is first identified. This can result in a high probability of finding a CSG cell thereby not triggering too many CSG cell searches compared to conventional fingerprinting approaches used for finding CSG cells.

The processor 212 can control overall operation and/or configuration of the communication device 200. The processor 212 may receive information from, among other things, the user interface 218 and/or from other electrical devices or host devices that are coupled to the communication device 200. The processor 210 can provide this information to the cellular module 202, the GNSS module 204, the WLAN module 206, the memory 214, and/or the user interface 218. Additionally, the processor 212 can receive information from the cellular module 202, the GNSS module 204, the WLAN module 206 and/or the memory 214. The processor 212 may provide this information to the user interface 218, to other electrical devices or host devices, and/or to the cellular module 202, the GNSS module 204, the WLAN module 206 and/or the memory 214 via the communication interface 216. Further, the processor 212 can execute one or more applications such as SMS for text messaging, electronic mailing, and/or audio and/or video recording, and/or software applications such as a calendar and/or a contact list to provide some examples. The processor 212 can also execute searches for wireless APs and CSG-BSs such as the exemplary embodiments described herein.

The user interface 218 can include a display, such as a touch-screen display, an alphanumeric keypad, a microphone, a mouse, a speaker, or another suitable input/output device capable of receiving user input and/or providing data to the user of the device. User provided information can be input into the user interface 218 such as by typing on the alphanumeric keypad, typing or selecting on the touch-screen display, selecting with the mouse, receiving verbal information and commands from the microphone, and/or through other methods of receiving user input. Information can be provided to the user through the user interface 218 such as by displaying the information on the touch-screen display, providing verbal information through the speaker, or through other methods of conveying and/or displaying information. The user interface 218 can interface with the host processor 212 to provide information to the host processor 212, such as via the communication interface 216 and to display information provided by the host processor 212 via the communication interface 216 to the user of the device. The user interface 216 can also receive and provide information to/from the cellular module 202, the GNSS module 204, the WLAN module 206 and/or the memory 214.

The communication interface 216 can route various communications between the cellular module 202, the GNSS module 204, the WLAN module 206, the host processor 212, the memory 214, and/or the user interface 218. These communications can include various digital signals, such as one or more commands and/or data, various analog signals, such as direct currents (DC) and/or voltages to provide some examples, or any combination thereof. The communication interface 216 can be implemented as a series of wired and/or wireless interconnections between the cellular module 202, the GNSS module 204, the WLAN module 206, the host processor 212, the memory 214, and/or the user interface 218. The interconnections of the communication interface 216, as well as interconnections of other communication interfaces that are discussed below, can be arranged to form a parallel interface to carry communications between various modules of the communication device 200 in parallel using multiple conductors, a serial interface to carry communications between various modules of the communication device 200 using a single conductor, or any combination thereof. A communication device, such as the communication device 200, may include one or more integrated circuits that can be configured and arranged to form one or more modules, such as the cellular module 202, the GNSS module 204, the WLAN module 206, the host processor 212, the memory 214, and/or the user interface 218 to provide some examples.

Figure 3:
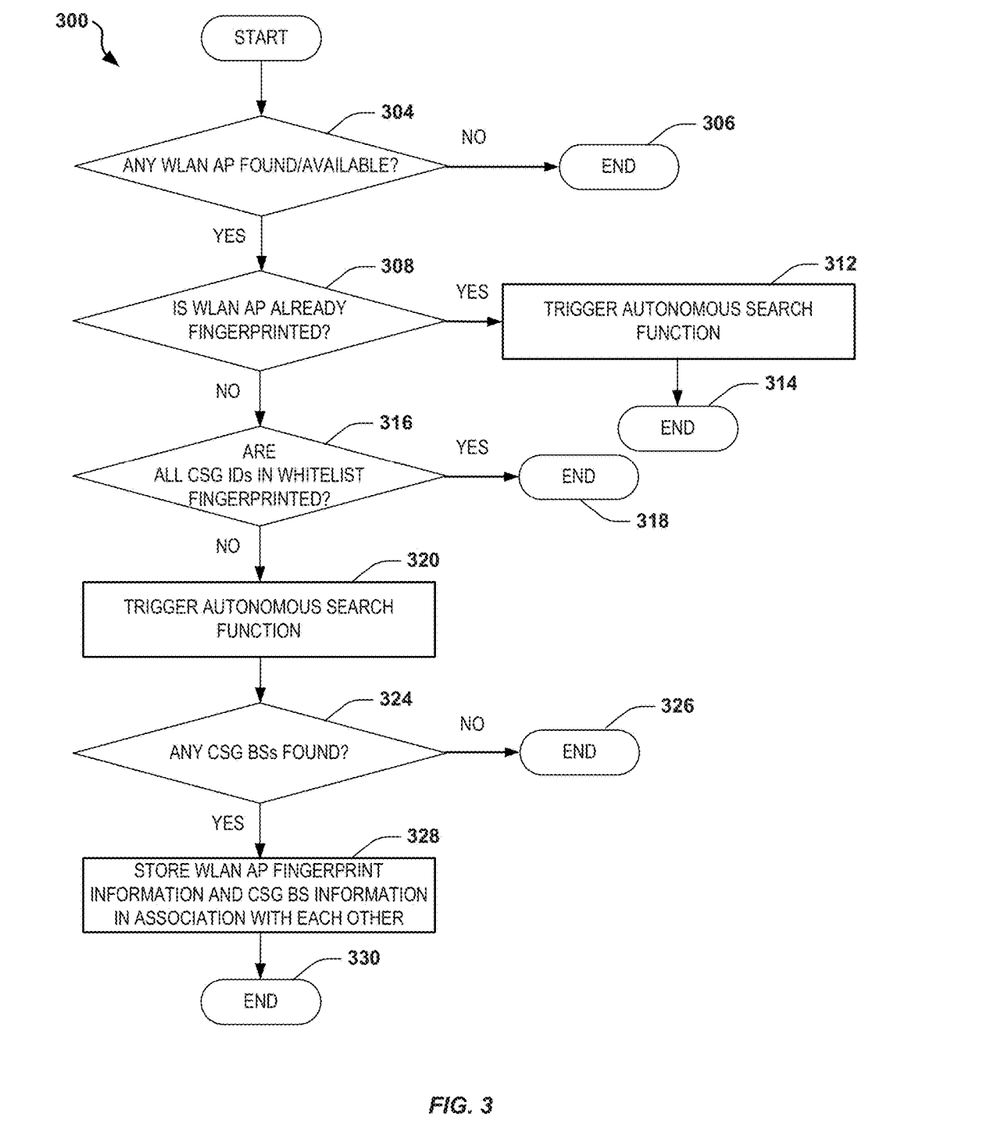
FIG. 3 illustrates a flow chart of an exemplary process for identifying, detecting and obtaining service on closed subscriber group (CSG) systems.

FIG. 3 illustrates a flow chart of an exemplary process 300 for identifying, detecting and obtaining service on CSG systems. The process 300 is exemplary only and stages can be rearranged, added or omitted, depending on the embodiment. The process 300 will be described with further reference to FIGS. 1 and 2. The process 300 could be used to work with any two different communication systems and not just a WLAN system and a CSG system as described herein.

At 304, the WLAN module 206 determines whether the WLAN search algorithm 210 has found one or more WLAN cells of a wireless AP such as the WLAN cell 115 of the Wireless AP 114. If no WLAN cell is found at 304, the process 300 terminates at 306. If a WLAN cell is found to be available at 304, the process 300 continues at 308.

At 308, the WLAN module 206 may determine if the WLAN cell and/or WLAN AP identified at 305 has already been fingerprinted by the ASF 208 and the cellular module 202. The WLAN module 206 can determine if a WLAN AP or WLAN cell has been previously fingerprinted by comparing information such as, for example, a WLAN AP identifier, a WLAN cell identifier, a Wi-Fi™ identifier including a MAC address, and/or signal strength of the WLAN AP or WLAN cell to fingerprint data stored in the fingerprint database 215. Alternatively, the WLAN module 206 may pass this information to the cellular module 202 and the cellular module 202 can compare the information to the fingerprint data stored in the fingerprint database 215.

If it is determined at 308 that a WLAN AP or WLAN cell has already been fingerprinted in the fingerprint database 215, the process 300 continues to 312 where the cellular module 202 triggers the ASF 208 at 312 to perform a search for a CSG BS 118 or cell associated with the CSG BS 118 based on CSG fingerprint information stored in the fingerprint database 215 in association with the WLAN fingerprint information. The ASF 208 can trigger CSG selection based on the CSG fingerprint information that can include a specific frequency band for a saved CSG, a specific radio access technology (RAT), an ARFCN (e.g., a UARFCN for the UMTS or an EARFCN for LTE systems), RSRP and/or RSSI. Upon successfully finding the associated CSG BS 118 or CSG cell 119 fingerprint information stored in the fingerprint database 215, the cellular module 202 establishes a connection with the CSG BS 118 or CSG cell 118 using the ASF 208 and the process 300 terminates at 314.

If it is determined at 308 that the WLAN information does not match any of the WLAN fingerprint information in the fingerprint database 215, the process 300 continues to 316 where the cellular module 202 determines if all CSG identifiers in a whitelist of allowable CSG sites are all fingerprinted. If all CSG identifiers in the whitelist of the communication device 200 are already fingerprinted, the process 300 terminates at 318. If it is determined that there are some CSG identifiers in the whitelist that have not been fingerprinted, the process 300 continues to 320 where the ASF 208 is triggered at 320 to perform an autonomous search for CSG BSs and/or CSG cells with CSG identifiers that are in the whitelist.

At 324, if none of the fingerprinted CSG BSs and/or CSG cells were found via the autonomous search function at 320, the process 300 terminates at 326. If one of the fingerprinted CSG BSs and/or CSG cells is found at 324, the process continues at 328 where the WLAN fingerprint information (e.g., WLAN AP identifier, a WLAN cell identifier, a Wi-Fi™ identifier including a MAC address, and/or signal strength of the WLAN AP or WLAN cell) is stored in the fingerprint database 215 in association with the CSG fingerprint information (e.g., a specific frequency band for a saved CSG, a specific RAT, ARFCN (e.g., a UARFCN for UMTS or an EARFCN for LTE systems), RSRP and/or RSSI.

Upon storing the newly found fingerprint information at 328, the process 300 terminates at 330. The process 300 can be repeated periodically, randomly or using any other form of scheduling.

It should be noted that the present disclosure includes various diagrams that may depict an example architectural or other configuration for the various embodiments, which is done to aid in understanding the features and functionality that can be included in embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the terms "example" or "exemplary" are used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the disclosure are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
  initiating a wireless local area network (WLAN) cell search in preparation for performing a closed subscriber group (CSG) cell search;
  responsive to determining that no WLAN cell is found via the WLAN cell search, terminate the CSG cell search; and
  responsive to determining that at least one WLAN cell is found via the WLAN cell search:
    receiving, during the WLAN cell search, first information from a first access point (AP) of the at least one WLAN cell that supports a first wireless technology comprising WLAN technology, the first information identifying the first AP;
    determining whether the first information matches second information stored in a memory that is assigned to third information stored in the memory, the third information identifying a second AP of a first CSG cell that supports a second wireless technology; and
    upon determining that the first information matches the second information:
      performing the CSG cell search; and
      establishing, responsive to the CSG cell search locating the first CSG cell, a communication connection with the second AP to communicate with a communication device using the second wireless technology, based on the third information.

2. The method of claim 1, further comprising:
  prior to receiving the first information, receiving the second information from the first AP, the second information being indicative of the first AP;
  storing the second information in the memory;
  upon receiving the second information, establishing a connection with the second AP; and
  upon establishing the connection with the second AP, receiving the third information from the second AP; and
  storing the third information in the memory in association with the second information.

3. The method of claim 2, further comprising:
  prior to storing the third information, determining if the second AP is on a list of qualified APs; and
  upon determining that the second AP is on the list of qualified APs, storing the third information.

4. The method of claim 1, upon determining that WLAN information for all CSG cells on a CSG cell list are stored in the memory, and that the first information does not match any of the WLAN information stored in the memory, terminate the CSG cell search.

5. The method of claim 1, wherein the first information and the second information comprise at least one of a medium access control (MAC) identifier, an AP identifier, a cell identifier, and a signal strength indicator.

6. The method of claim 1, wherein the third information comprises at least one of a frequency band, a radio access technology, a radio frequency and a channel number.

7. The method of claim 1, wherein the third information comprises at least one of a reference signal receive power (RSRP) or a received signal strength indicator (RSSI).

8. An apparatus comprising:
  a first wireless module configured to:
    establish a first wireless connection with a first access point (AP) that supports a first wireless technology comprising WLAN technology;
    receive first information from the first AP, the first information identifying the first AP; and
  a second wireless module configured to:
    establish a second wireless connection with a second AP of a first closed subscriber group (CSG) cell that supports a second wireless technology;
    receive second information from the second AP, the second information identifying the second AP;
    communicate using the second wireless technology via the second wireless connection established with the second AP; and
    store the first information in association with the second information in a memory, the first information assigned to the second information; and
  the first wireless module further configured to:
    initiate a WLAN cell search in preparation for performing a CSG cell search;

responsive to determining that no WLAN cell is found via the WLAN cell search, terminate the CSG cell search; and responsive to determining that at least one WLAN cell is found via the WLAN cell search:
receive third information from the first AP during the WLAN cell search;
determining whether the third information matches the first information stored in the memory that is assigned to the second information;
upon determining that the third information matches the first information:
performing the CSG cell search; and
establishing, responsive to the CSG cell search locating the first CSG cell, a further communication connection with the second AP.

9. The apparatus of claim 8, wherein:
the first wireless module is further configured to:
establish a third wireless connection with the first AP at a time subsequent to ending the first wireless connection, and
provide an indication to the second wireless module indicative of establishing the third wireless connection with the first AP; and
the second wireless module is further configured to:
upon receiving the indication indicative of establishing the third wireless connection with the first AP, retrieve the second information stored in association with the first information, and
establish a fourth wireless connection with the second AP based, at least in part, on the retrieved second information.

10. The apparatus of claim 8, wherein:
prior to the second wireless module storing the first information in association with the second information, the second wireless module determines if the second AP is on a list of qualified APs; and
upon determining that the second AP is on the list of qualified APs, the second wireless module stores the first information in association with the second information.

11. The apparatus of claim 8, further comprising:
a location based services module configured to receive location information and store the location information in the memory in association with the first information and/or the second information.

12. The apparatus of claim 8, wherein the first information comprises at least one of an AP identifier and a cell identifier, a medium access control (MAC) identifier and a signal strength indicator.

13. The method of claim 8, wherein the second information comprises at least one of a frequency band, a radio access technology, a radio frequency and a channel number.

14. The method of claim 8, wherein the second information comprises at least one of a reference signal receive power (RSRP) or a received signal strength indicator (RSSI).

15. A computer program product, embodied on a non-transitory computer-readable medium, comprising:
computer code for:
receiving first information from a first access point (AP) that supports a first wireless technology comprising WLAN technology over a first wireless connection, the first information identifying the first AP;
upon receiving the first information, establishing a second wireless connection with a second AP of a first closed subscriber group (CSG) cell that supports a second wireless technology;
upon establishing the second wireless connection, receiving second information from the second AP identifying the second AP;
communicating with a communication device using the second wireless technology via the second wireless connection established with the second AP;
storing the first information in association with the second information in a memory, the first information assigned to the second information; and
initiate a WLAN cell search in preparation for performing a CSG cell search;
responsive to determining that no WLAN cell is found via the WLAN cell search, terminate the CSG cell search; and
responsive to determining that at least one WLAN cell is found via the WLAN cell search:
receive third information from the first AP during the WLAN cell search;
determining whether the third information matches the first information stored in the memory that is assigned to the second information;
upon determining that the third information matches the first information:
performing the CSG cell search; and
establishing, responsive to the CSG cell search locating the first CSG cell, a further communication connection with the second AP.

16. The computer program product of claim 15 further comprising computer code for:
establishing a third wireless connection with the first AP at a time subsequent to ending the first wireless connection, and
upon establishing the third wireless connection with the first AP, retrieving the second information stored in association with the first information, and
establishing a fourth wireless connection with the second AP based, at least in part, on the retrieved second information.

17. The computer program product of claim 15, further comprising computer code for:
prior to storing the first information in association with the second information, determining if the second AP is on a list of qualified APs; and
upon determining that the second AP is on the list of qualified APs, storing the first information in association with the second information.

18. The computer program product of claim 15, wherein the first information comprises at least one of an AP identifier, a cell identifier and location information.

19. The computer program product of claim 15, wherein the first information comprises at least one of a medium access control (MAC) identifier and a signal strength indicator.

20. The computer program product of claim 15, wherein the second information comprises at least one of a frequency band, a radio access technology, a radio frequency and a channel number.

* * * * *